(12) United States Patent
Abbott et al.

(10) Patent No.: US 12,556,080 B2
(45) Date of Patent: Feb. 17, 2026

(54) MAGNETIC COGGING PARALLEL-ELASTIC ACTUATOR

(71) Applicant: University of Utah Research Foundation, Salt Lake City, UT (US)

(72) Inventors: Jake J. Abbott, Salt Lake City, UT (US); Shad Roundy, Salt Lake City, UT (US); Jacob Aman, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 18/858,407

(22) PCT Filed: May 11, 2023

(86) PCT No.: PCT/US2023/066894
§ 371 (c)(1),
(2) Date: Oct. 21, 2024

(87) PCT Pub. No.: WO2023/220687
PCT Pub. Date: Nov. 16, 2023

(65) Prior Publication Data
US 2025/0112537 A1  Apr. 3, 2025

Related U.S. Application Data

(60) Provisional application No. 63/341,633, filed on May 13, 2022.

(51) Int. Cl.
*H02K 49/10* (2006.01)
*B25J 9/00* (2006.01)
(52) U.S. Cl.
CPC .......... *H02K 49/106* (2013.01); *B25J 9/0006* (2013.01)

(58) Field of Classification Search
CPC .. H02K 49/106; H02K 49/104; H02K 49/102; H02K 49/10; B25J 9/0006
(Continued)

(56) References Cited

U.S. PATENT DOCUMENTS

| | | |
|---|---|---|
| 4,501,980 A | 2/1985 | Welburn |
| 4,774,425 A | 9/1988 | Rusu et al. |

(Continued)

FOREIGN PATENT DOCUMENTS

JP  2011256544  12/2011

OTHER PUBLICATIONS

Abbott et al., Cogging-Torque Actuator, TVC, University of Utah, 2018, 1 page.
(Continued)

*Primary Examiner* — Michael Andrews
(74) *Attorney, Agent, or Firm* — Thorpe North & Western, LLP

(57) ABSTRACT

A magnetic cogging parallel-elastic actuator (100) can include a motor (102) having an output shaft (104). The actuator (100) can further include a cogging-torque element (106). The cogging-torque element (106) can include a stator that is stationary relative to the motor (102) and a rotor that is rotatable relative to the stator and comprises an output shaft (104). A plurality of stator magnet elements can be disposed radially about the stator and a plurality of rotor magnet elements can be radially positioned about the rotor. The output shaft (108) of the rotor of the cogging-torque element (106) can be connected in parallel with the output shaft (104) of the motor (102) such that an output torque of the actuator (100) is a sum of a torque of the cogging-torque element (106) and a torque of the motor (102).

20 Claims, 13 Drawing Sheets

(58) Field of Classification Search
USPC .................................................. 310/103–110
See application file for complete search history.

(56) References Cited

U.S. PATENT DOCUMENTS

| | | | |
|---|---|---|---|
| 5,059,884 A | 10/1991 | Shah et al. | |
| 5,677,581 A | 10/1997 | Yoshida et al. | |
| 7,148,592 B2 | 12/2006 | Miyawaki | |
| 8,598,757 B2 | 12/2013 | Hsu et al. | |
| 8,816,554 B2 | 8/2014 | Li et al. | |
| 9,356,500 B2 | 5/2016 | Furlan et al. | |
| 2008/0278015 A1 | 11/2008 | Reisinger | |
| 2011/0298310 A1 | 12/2011 | Ross et al. | |
| 2012/0080968 A1 | 4/2012 | Knight et al. | |
| 2012/0120516 A1* | 5/2012 | Harrell | H02K 1/2783 359/896 |
| 2013/0140477 A1 | 6/2013 | Shimane | |
| 2013/0278098 A1 | 10/2013 | Bourqui et al. | |
| 2015/0075886 A1* | 3/2015 | Tonari | H02K 51/00 180/65.245 |
| 2015/0076948 A1* | 3/2015 | Katou | H02K 7/11 310/103 |
| 2016/0294252 A1* | 10/2016 | Whiteley | H02K 1/2726 |
| 2017/0166061 A1 | 6/2017 | Isono et al. | |
| 2017/0198728 A1* | 7/2017 | Noda | A61H 3/00 |
| 2018/0167001 A1 | 6/2018 | Olsson | |
| 2018/0319635 A1 | 11/2018 | Hiekata et al. | |
| 2020/0018318 A1* | 1/2020 | Chen | A61M 60/422 |
| 2020/0274431 A1 | 8/2020 | Abbott et al. | |
| 2022/0249183 A1* | 8/2022 | Charles | A61B 34/20 |
| 2022/0255400 A1* | 8/2022 | Takeda | H02K 7/116 |

OTHER PUBLICATIONS

Aman, Maximizing Cogging Torque in a Radial-Flux Motor: Toward a Novel Cogging-Torque Actuator, Thesis submitted to faculty of The University of Utah, Department of Electrical and Computer Engineering, 2019, 20 pages.

Sudano et al., A Resonant Parallel Elastic Actuator for Biorobotic Applications, ResearchGate Conference Paper, https://www.researchgate.net/publication/263298091, 2014, 7 pages.

Reinholz, A Cogging-Torque-Assisted Motor Drive for Internal Combustion Engine Valves, Thesis submitted to The University of British Columbia, The College of Graduate Studies, 2014, 97 pages.

* cited by examiner

MAGNETIC COGGING PARALLEL-ELASTIC ACTUATOR

CROSS REFERENCE TO RELATED APPLICATIONS

This application claims priority to U.S. Provisional Application No. 63/341,633, filed on May 13, 2022, which is incorporated herein by reference.

STATEMENT REGARDING FEDERALLY SPONSORED RESEARCH OR DEVELOPMENT

This invention was made with government support under 2147765 awarded by the National Science Foundation. The government has certain rights in the invention.

NAMES OF THE PARTIES TO A JOINT RESEARCH AGREEMENT

Not applicable.

INCORPORATION BY REFERENCE STATEMENT

Not applicable.

BACKGROUND

Electric motors are commonly used in a wide variety of applications. One such application is in robotics in which an electric motor can be used as an actuator for operating and moving various appendages, joints, and limbs of a robotic device. In many robotic applications, robotic limbs, appendages, end effectors, and other devices can be used to manipulate and support loads. Such applications may benefit from actuators having a higher torque and a lower speed than is commonly found in electric motors to ensure adequate support and safe handling of loads held by a robot.

In order to raise the torque and lower the speed of electric motors, such electric motors used in robotic systems are typically highly geared in order to achieve gear ratios that correspond to lower speed and higher torque. However, highly geared motor systems can add several undesirable and nonlinear side-effects to the electric motor. For example, backlash and stick-slip friction are commonly introduced when gearing a motor, which reduce the efficiency of electric motors. Furthermore, highly geared motor systems often have close to zero compliance (i.e., infinite impedance). Lack of compliance is an undesirable characteristic for an actuator used in robotic applications because a lack of compliance can decrease safety for people interacting with the robot and can be harmful to safe and long-term operation for the robot itself.

Direct-drive motors, which directly drive a load without intervening gears, are an optional alternative to geared motors. However, direct-drive motors are typically weak for their size, which makes direct-drive motors undesirable for use in robots because of the added weight and decrease in efficiency resulting from using direct-drive motors.

Furthermore, it is desirable for actuators for robots to be backdrivable as well as have the ability to hold a pose, under load, while consuming little to no power. However, there is an inherent tradeoff between the ability for a robotic actuator to be backdriven and the ability to passively hold a static position using a holding torque. A holding torque can be achieved by adding a brake to a robotic actuator such as an electric motor. However, a brake typically cannot be back-driven. A robotic actuator can further use a series clutch actuator, which is essentially a friction brake with a designable load (i.e., torque) at which the brake slips to achieve a holding torque. However, a series-clutch actuator adds undesirable nonlinearities to an actuator. Therefore, it continues to be desirable to develop electric motors, suitable for use as robotic actuators, that are compliant, backdriveable, and are capable of holding a pose under a load while consuming little to no power.

SUMMARY

An initial summary of the disclosed technology is provided here. Specific technology examples are described in further detail below. This initial summary is intended to set forth examples and aid readers in understanding the technology more quickly but is not intended to identify key features or essential features of the technology nor is it intended to limit the scope of the claimed subject matter.

In one example of the present disclosure, an actuator is disclosed. The actuator can include a motor comprising an output shaft and a cogging-torque element. The cogging-torque element can include a stator that is stationary relative to the motor and a rotor that is rotatable relative to the stator and comprises an output shaft. The cogging-torque element can further include a plurality of stator magnet elements disposed radially about the stator and a plurality of rotor magnet elements radially positioned about the rotor. The output shaft of the rotor of the cogging-torque element can be connected in parallel with the output shaft of the motor such that an output torque of the actuator is a sum of a torque of the cogging-torque element and a torque of the motor.

In another example of the present disclosure, a system is disclosed. The system can comprise a first structural member and a second structural member coupled to the first structural member at a joint. The system can further include an actuator associated with the joint and operable to move the first structural member relative to the second structural member about the joint. The actuator can include a motor comprising an output shaft and a cogging-torque element. The cogging-torque element can include a stator that is stationary relative to the motor and a rotor that is rotatable relative to the stator and comprises an output shaft. The cogging-torque element can further include a plurality of stator magnet elements disposed radially about the stator and a plurality of rotor magnet elements radially positioned about the rotor. The output shaft of the rotor of the cogging-torque element can be connected in parallel with the output shaft of the motor such that an output torque of the actuator is a sum of a torque of the cogging-torque element and a torque of the motor.

In at least some examples of the present disclosure, the system can be at least one of a robotic system, an exoskeleton, a prosthesis, or a medical rehabilitation device.

Figure 1:
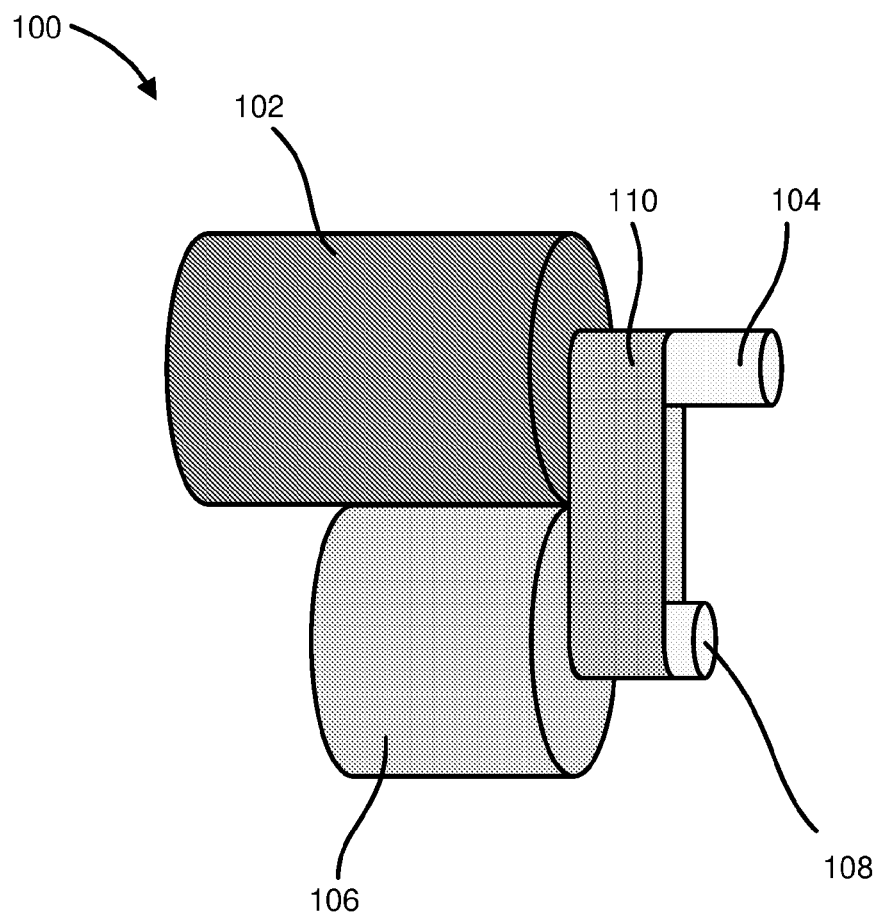
FIG. 1 is a schematic of a magnetic cogging parallel-elastic actuator (MC-PEA) in accordance with an example of the present disclosure, in which the MC-PEA has a parallel axis configuration.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a motor" includes reference to one or more of such devices and reference to "the lead" refers to one or more of such electrodes.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, or combinations of each.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

This disclosure discusses a magnetic cogging parallel-elastic actuator (MC-PEA). Various examples of magnetic cogging parallel-elastic actuators (MC-PEA), in accordance with principles of this disclosure, are discussed below with reference to the figures. FIG. 1 illustrates a magnetic cogging parallel-elastic actuator (MC-PEA) 100 in accordance with one example of the present disclosure. As shown, the MC-PEA 100 can include a motor 102. The motor can be, for example, a DC electric motor, however it is to be understood that this disclosure is not intended to limit the motor 102 to only a DC electric motor. The motor can further be a brushless DC motor, a brushed DC motor, a hydraulic motor, a pneumatic motor, an induction motor, or any motor used to apply a torque to drive an element. The motor 102 can include an output shaft 104 that facilitates connection between the motor 102 and one or more mechanisms or members to be driven, moved, or controlled by the motor 102. For example, the output shaft 104 could be coupled to one or more joints or moveable members of a robotic system or exoskeleton. In such applications, the motor 102 can be used to move one or more limbs or joints of a robot.

The MC-PEA 100 can further include a cogging-torque element (CTE) 106. The CTE 106 can include an output shaft 108. The output shaft 108 of the CTE 106 can be mechanically coupled to the output shaft 104 of the motor 102 by a drive belt 110. The drive belt 110 could alternatively be a drive chain or any other element for mechanically coupling two or more output shafts to each other. Non-limiting examples of suitable coupling elements can include belts, gears, chains, capstan drive, and the like. In FIG. 1, the output shaft 108 of the CTE 106 is connected in parallel with the output shaft 104 of the motor 102 via the drive belt 110. As used herein, the term "in parallel," as in "connected in parallel," means that the torques generated by the motor and the CTE sum at the output of the MC-PEA. The CTE is "in parallel" with the motor in the sense that the torque of the motor and the torque of the CTE are superimposed at the output shaft. Any configurations that create this relationship between the torque of the CTE and the torque of the motor are within the scope of this disclosure. This definition of "in parallel" holds regardless of whether the CTE and motor share a common output shaft, or have separate output shafts. Furthermore, positions of the output shaft of the CTE and the motor relative to each other, whether axially aligned, axially parallel, or otherwise can still be considered "in parallel" when the torques generated by the motor and the CTE sum at the output of the MC-PEA. For example, in the parallel connection configuration shown in FIG. 1, the output torque of the MC-PEA 100 (e.g., at the output shaft 104 of the motor 102) is a sum of a torque of the CTE 106 and a torque of the motor 102.

Figure 2A:
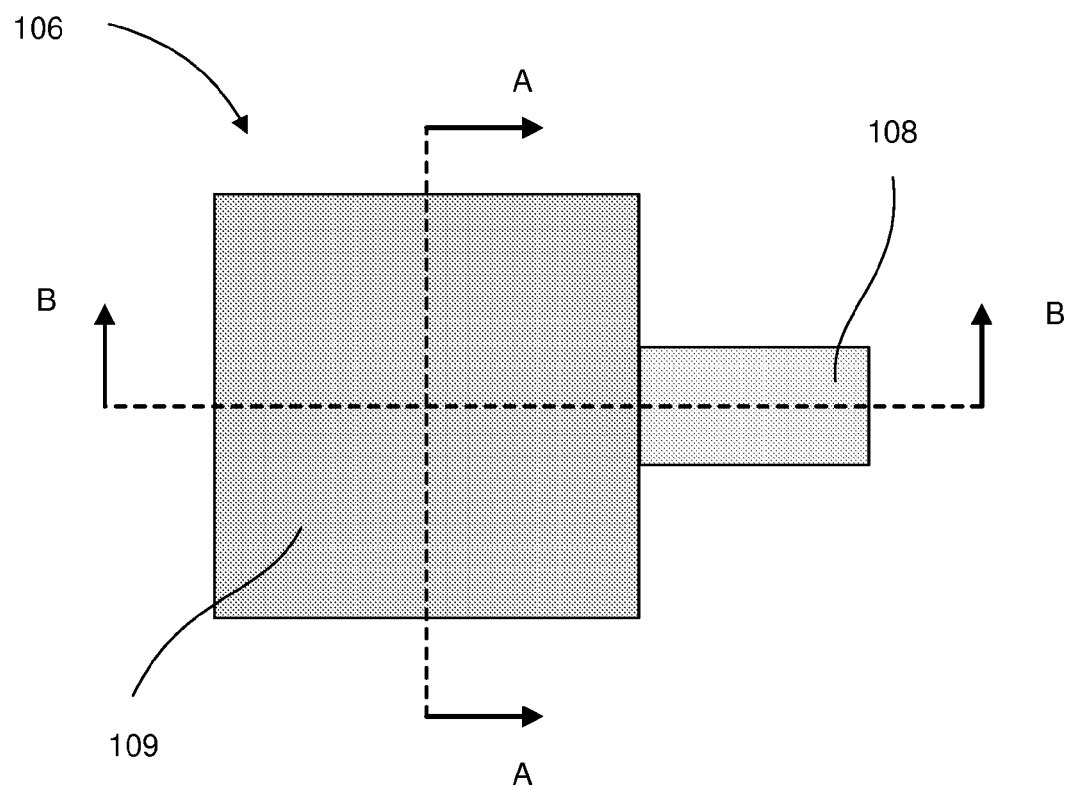
FIG. 2A is a side view of a cogging-torque element (CTE) in accordance with an example of the present disclosure.
Figure 2B:
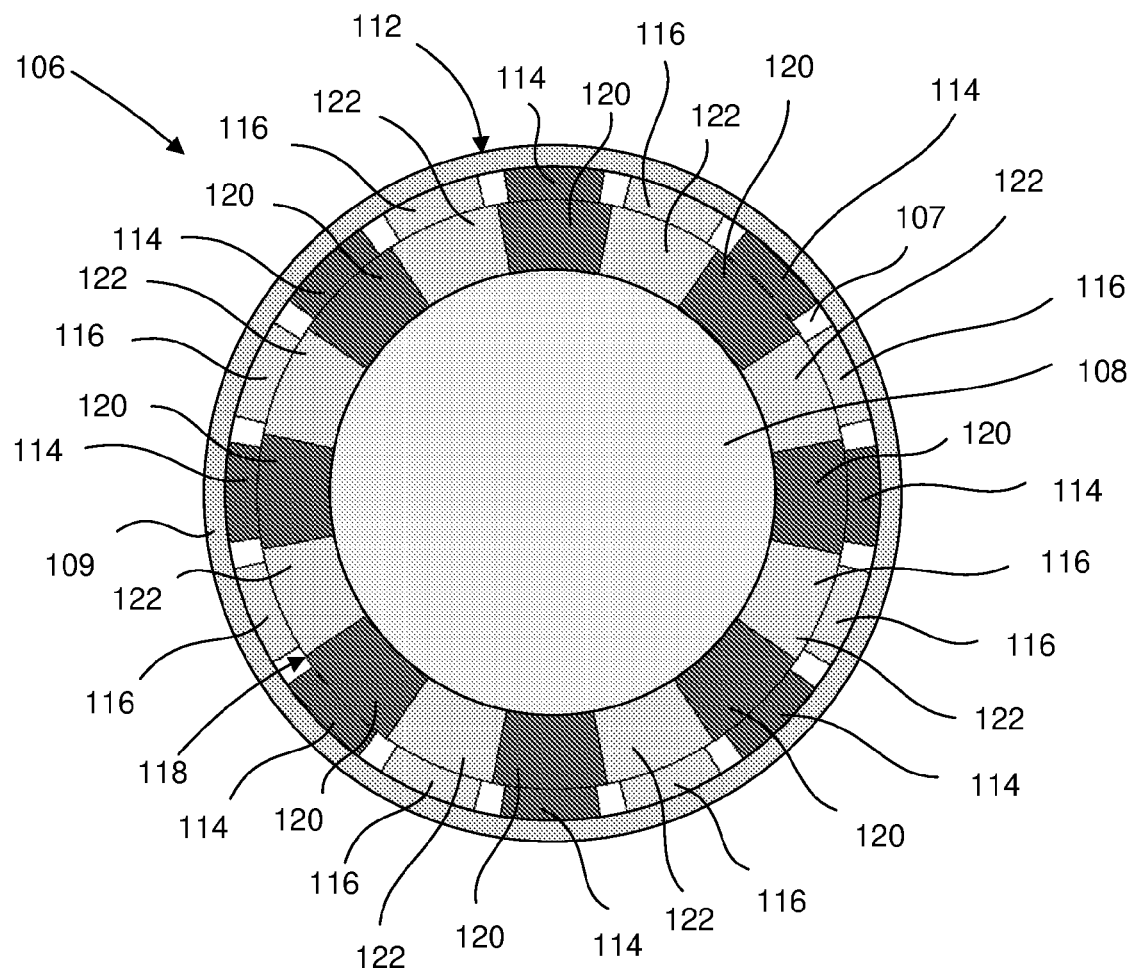
FIG. 2B is a cross-sectional view of the cogging-torque element (CTE) of FIG. 2A taken along line AA.
Figure 2C:
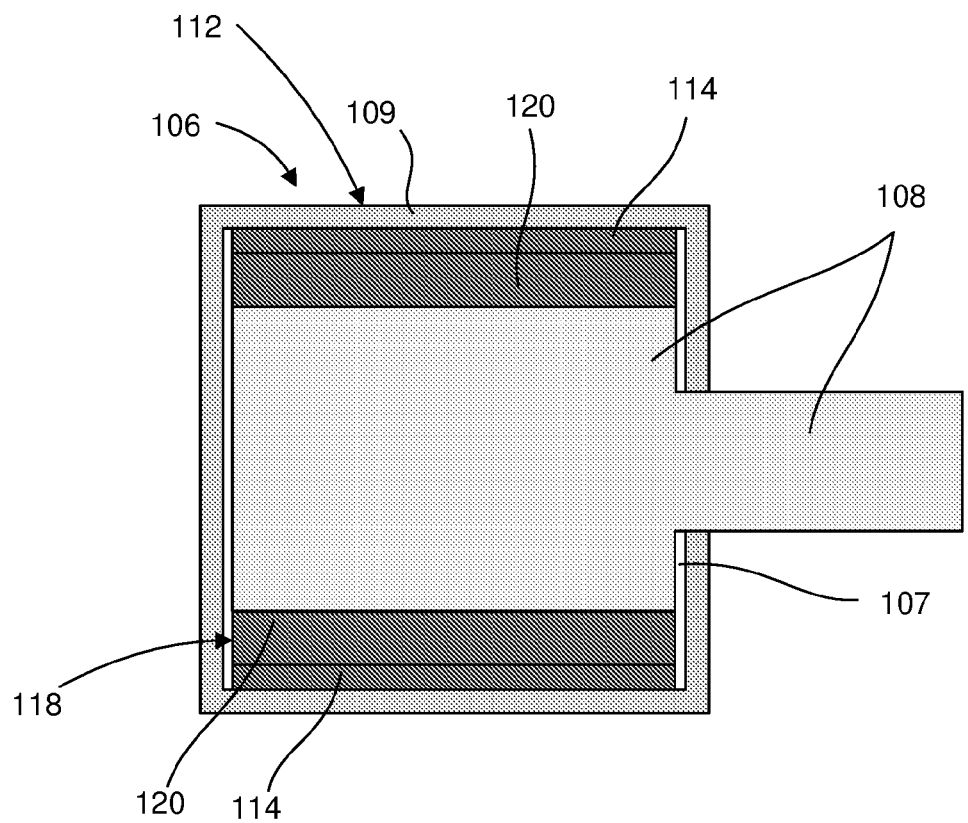
FIG. 2C is a cross-sectional view of the cogging-torque element (CTE) of FIG. 2A taken along line BB.

FIGS. 2A-2C illustrate an exemplary internal configuration of the CTE 106. FIG. 2A illustrates a side view of the CTE 106. FIG. 2B illustrates a cross-sectional view of CTE 106 taken along line AA shown in FIG. 2A. FIG. 2C illustrates a cross-sectional view of CTE 106 taken along line BB shown in FIG. 2A. As shown in FIGS. 2A and 2C, the CTE 106 can include an output shaft 108 and a housing 109. The housing 109 can house several other components of the CTE 106 within an internal volume 107 defined by the housing 109. For example, within the housing 109, the CTE 106 can include a stator 112 comprising the housing 109 and multiple stator magnet elements coupled to the housing 109 at an inner surface of the housing 109 and positioned radially about the stator 112 at intervals around the inner surface of the housing 109. The stator 112 can be stationary relative to the motor 102 shown in FIG. 1. The stator magnet elements can include first stator magnets 114 having a first polarity and second stator magnets 116 having a second polarity different from the first polarity. The first stator magnets 114 and the second stator magnets 116 can be arranged radially about the stator 112 such that the polarities of the stator magnet elements alternate between the first polarity (e.g., radially inward magnetization) and the second polarity (e.g., radially outward magnetization) around the stator 112. In other words, the magnet elements about the stator 112 can be arranged to alternate between first stator magnets 114 and second stator magnets 116. As one example, the first plurality of the first stator magnets 114 can be radially inward relative to the stator 112 and towards a center of the CTE 106 and the second polarity of the second stator magnets 116 can be radially outward relative to the stator 112 and away from the center of the CTE 106 as shown in FIG. 2B. The stator 112 can be a permanent magnet stator in which at least some, or all, of the stator magnet elements are permanent magnets. Alternatively, at least some, or all, of the stator magnet elements can be at least partially made of soft magnetic materials. Also, the stator magnet elements can comprise a combination of permanent magnets and soft magnetic materials.

The CTE 106 can further include a rotor 118 comprising the output shaft 108 and multiple rotor magnet elements coupled to a portion of the output shaft 108 disposed within the housing 109. The rotor magnet elements can be disposed on an outer surface of the portion of the output shaft 108 within the housing 109 to be positioned radially about the rotor 118. The rotor 118 can rotate relative to the stator 112 and the motor 102. The rotor magnet elements can include first rotor magnets 120 having a first polarity and second rotor magnets 122 having a second polarity different from the first polarity. The first rotor magnets 120 and the second rotor magnets 122 can be arranged radially about the rotor 118 such that the polarities of the rotor magnet elements alternate between the first polarity (e.g., radially inward magnetization) and the second polarity (e.g., radially outward magnetization) around the rotor 118. In other words, the magnet elements about the rotor 118 can be arranged to alternate between first rotor magnets 120 and second rotor magnets 122. As one example, the first rotor magnets 120 can have a polarity directed radially inward relative to the rotor 118 and towards a center of the CTE 106 and the second polarity of the second rotor magnets 122 can be radially outward relative to the rotor 118 and away from the center of the CTE 106 as shown in FIG. 2B. The rotor 118 can be a permanent magnet rotor in which at least some, or all, of the rotor magnet elements are permanent magnets.

Alternatively, at least some, or all, of the rotor magnet elements can be soft magnetic materials. Also, the rotor magnet elements can comprise a combination of permanent magnets and soft magnetic materials.

As shown in FIG. 2B, the CTE 106 can include 16 separate rotor magnet elements and 16 corresponding stator magnet elements, each made up of first and second rotor magnets 120 and 122 and first and second stator magnets 114 and 116. This forms 8 pole pairs of alternating polarities in the CTE 106. However, it is to be understood that the configuration of 8 pole pairs, 16 rotor magnet elements, and 16 stator magnet elements is merely exemplary and that any number of magnet elements and pole pairs are intended to be within the scope of this disclosure. For example, the plurality of stator magnet elements (i.e., first stator magnets 114 and second stator magnets 116) can include an even-integer number of N magnet elements. Furthermore, the plurality of rotor magnet elements (i.e., first rotor magnets 120 and second rotor magnets 122) can include an even-integer number of N magnet elements corresponding to the number of stator magnet elements. (e.g., the rotor and stator can each include 4 magnet elements, 6 magnet elements, 8 magnet elements, or any even-number integer).

In the example of FIG. 2B, CTE 106 includes a step size of 45° (i.e., there are 45° angles between each stable equilibrium). However, it is to be understood that different numbers of rotor and stator magnets in a CTE will lend to different step sizes and angles between stable equilibria. In other words, the CTE 106, and consequently the MC-PEA 100 including CTE 106, can include N/2 stable equilibria, with an associated step size of $(720/N)°$. The N/2 stable equilibria are created by the magnetic interaction between the plurality of stator magnet elements and the plurality of rotor magnet elements of the CTE 106. Accordingly, the CTE 106 can include multiple stable equilibria, which also each comprise a magnetic spring exerting a magnetic force biasing the rotor 118 of the CTE 106 toward each of the stable equilibria of the CTE 106 in a case in which the rotor 118 is moved relative to the stator 112 such that the rotor 118 is offset from any of the stable equilibria.

Having such stable equilibria, the MC-PEA 100 can remain stationary at the stable equilibria when no power is consumed by the motor. In other words, the MC-PEA 100 can hold loads up to some maximum torque (e.g., the cogging torque of the CTE 106) without consuming energy or generating heat. The "cogging torque" of the CTE 106 is the torque needed to overcome the opposing torque created by the magnetic attractive force between magnets on the rotor and the magnets of the stator. An applied torque (by either the motor 102, a load supported by the motor 102 at the output shaft 104, or a summation of the two) higher than the cogging torque will cause the MC-PEA 100 to cog over from one stable equilibrium to another. The motor 102 can be driveable to inject short bursts of energy to cause the CTE 106 to transition, or in other words, cog over from a current stable equilibrium to a different stable equilibrium. In some cases, the motor torque to transition the cogging-torque element from a first stable equilibrium to a second stable equilibrium is higher than a rated holding torque of the motor.

As long as the motor 102 and corresponding load does not apply a torque to the CTE 106 that is strong enough to overcome the cogging torque of the CTE 106, the CTE 106 will hold the motor 102 at a fixed point without consuming power or generating heat. Furthermore, as long as a load applied to either of the output shafts 104 and 108 is less than a cogging torque of the CTE 106, then the CTE 106 will hold the motor 102 at the stable equilibria without consuming power or generating heat, e.g. the applied torque just balances but does not exceed the cogging torque. In other words, the MC-PEA 100 is configured to apply a torque to the output shaft 108 of the motor 102 without the motor 102 being in operation.

The motor 102 can further be driveable to generate an oscillating torque to excite a resonance in the CTE 106 in which the rotor 118 of the CTE 106 oscillates around an equilibrium of the stable equilibria. The motor 102 can further be driveable to generate an oscillating torque to excite a resonance in the cogging-torque element in which the rotor of the cogging-torque element oscillates between a first equilibrium of the stable equilibria and a second equilibrium of the stable equilibria.

Figure 3A:
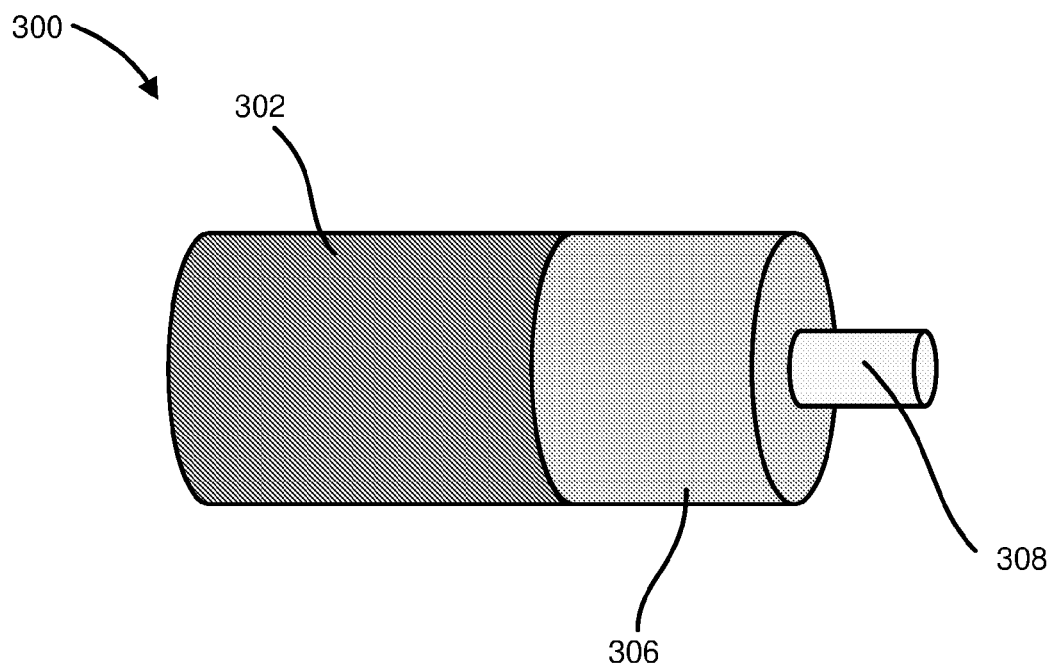
FIG. 3A is a schematic of a magnetic cogging parallel-elastic actuator (MC-PEA) in accordance with an example of the present disclosure, in which the MC-PEA has a co-axial configuration.
Figure 3B:
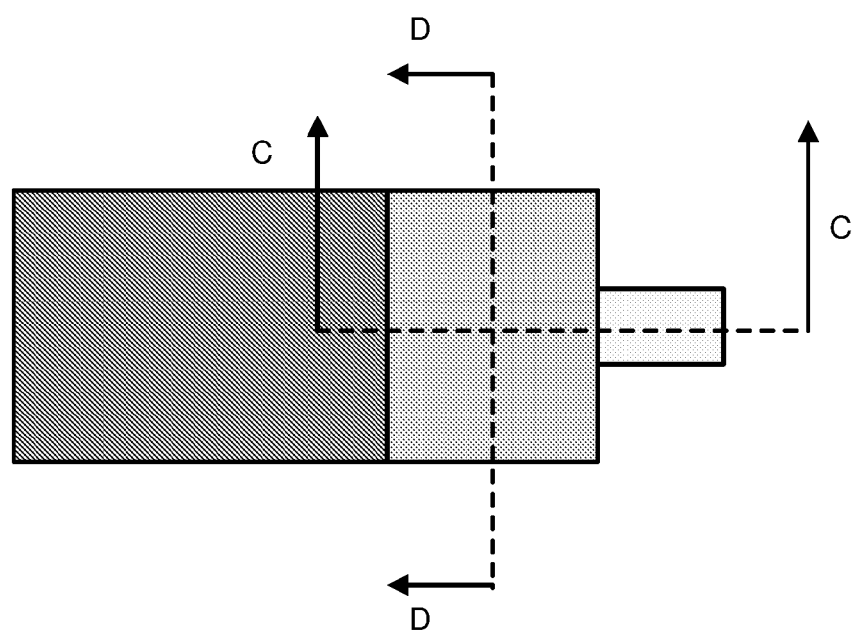
FIG. 3B is a side view of the cogging-torque element (CTE) of FIG. 3A.
Figure 3C:
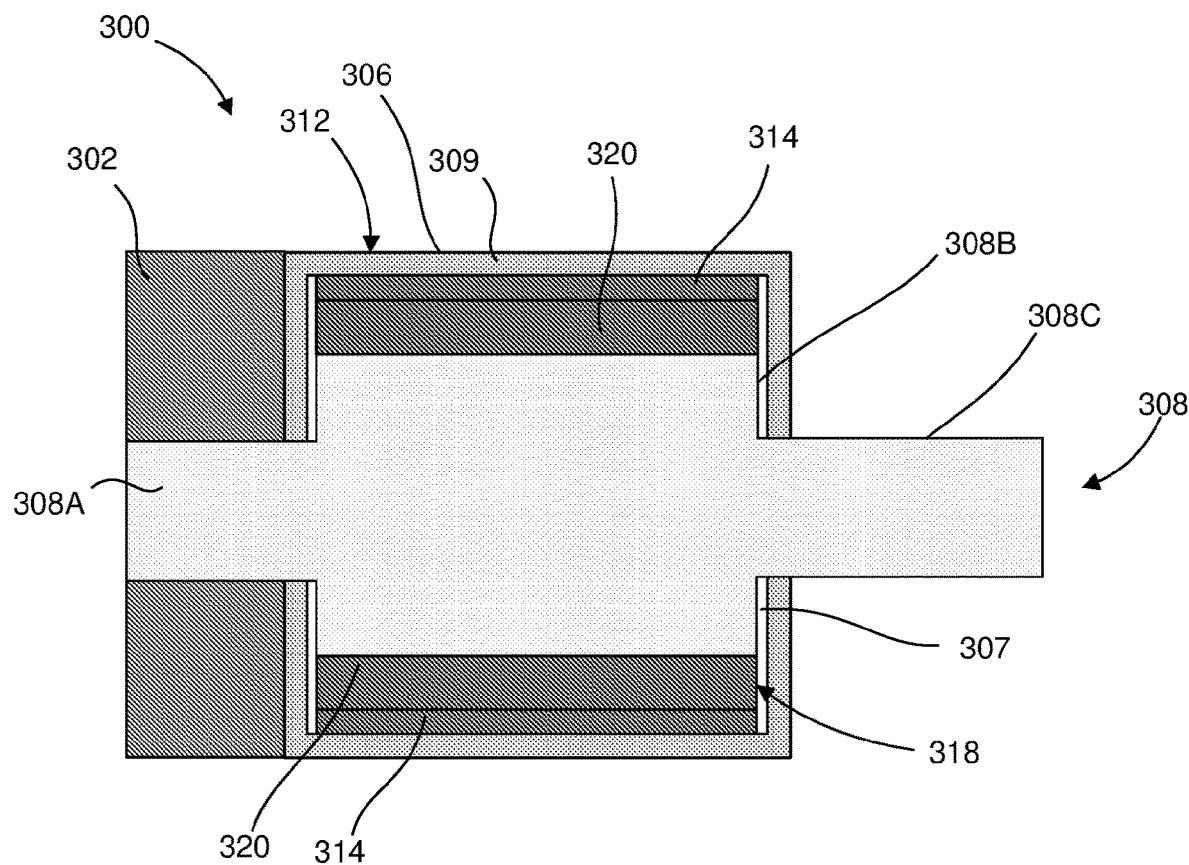
FIG. 3C is a cross-sectional view of the cogging-torque element (CTE) of FIG. 3A and FIG. 3B taken along line CC.

Alternative configurations of magnetic cogging parallel-elastic actuators (MC-PEA) are also possible in which the CTE is connected in parallel with a motor. For example, FIG. 3A illustrates an alternative MC-PEA 300 in which a motor 302 is connected to a CTE 306. The CTE 306 is connected to the MC-PEA 300 in a co-axial configuration in which the CTE 306 and the motor 302 share a common output shaft 308. Like FIG. 1, in such case as illustrated in FIG. 3A the CTE 306 is connected in parallel with the motor 302 such that an output torque of the actuator is a sum of a torque of the cogging-torque element and a torque of the motor. FIGS. 3B-3C illustrate an exemplary internal configuration of the MC-PEA 300. FIG. 3B illustrates a side view of the MC-PEA 300. FIG. 3C illustrates a partial cross-sectional view of MC-PEA 300 taken along line CC shown in FIG. 3B. The cross section of MC-PEA 300 taken along line DD shown in FIG. 3B would be essentially the same as the view of CTE 106 shown in FIG. 2B. In order to avoid redundant figures, the cross-sectional view taken along line DD will not be reproduced, but can be considered essentially represented by FIG. 2B. Except where explicitly stated to be different, it is to be understood that the disclosure and various features and properties of MC-PEA 100 also apply to MC-PEA 300.

In another alternative, the output shaft of the motor can be parallel but not co-axial with the output shaft of the cogging-torque element. In this case, each of the two output shafts can be connected such that an output torque of the actuator is a sum or a torque of the CTE and torque of the motor. In still another alternative, the output shaft of the motor can be perpendicular to the output shaft of the cogging-torque element and the two shafts are connected such that an output torque of the actuator is a sum of a torque of the cogging-torque element and a torque of the motor. For example, a bevel gear can be used to connect the two output shafts.

FIG. 3C illustrates an exemplary internal configuration of the CTE 306 in combination with motor 302 to form MC-PEA 300. As shown in FIG. 3C, the CTE 306 can include a housing 309 defining an interior volume 307. The CTE 306 and the motor 302 can share a common output shaft 308. The output shaft 308 can include a motor portion 308A that is within the motor 302 and driven by operation of the motor 302. The output shaft 308 can further include a CTE portion 308B disposed within the housing 309. The output shaft 308 can further include a shaft portion 308C configured to be couple to any component desired by a user to be moved by rotation of the output shaft 308 by the motor 302.

Similar to other exemplary MC-PEAs described herein, the housing 309 can house several other components of the CTE 306 within an internal volume 307 defined by the housing 309. For example, within the housing 309, the CTE 306 can include a stator 312 comprising the housing 109 and multiple stator magnet elements coupled to the housing 309 at an inner surface of the housing 309 and positioned radially about the stator 312 at intervals around the inner surface of the housing 309. The stator 312 can be stationary relative to the motor 302. The stator magnet elements can include first stator magnets 314 having a first polarity and second stator magnets (e.g., not shown but similar to second stator magnets 116 shown in FIG. 2B) having a second polarity different from the first polarity. The first stator magnets 314 and the second stator magnets can be arranged radially about the stator 312 such that the polarities of the stator magnet elements alternate between the first polarity (e.g., radially inward magnetization) and the second polarity (e.g., radially outward magnetization) around the stator 312. In other words, the magnet elements about the stator 312 can be arranged to alternate between first stator magnets 314 and second stator magnets. As one example, the first polarity of the first stator magnets 314 can be radially inward relative to the stator 312 and towards a center of the CTE 306 and the second polarity of the second stator magnets (e.g., not shown) can be radially outward relative to the stator 312 and away from the center of the CTE 306.

The CTE 306 can further include a rotor 318 comprising the output shaft 308 and multiple rotor magnet elements coupled to a portion of the output shaft 308 (e.g., the CTE portion 308B of the output shaft 308) disposed within the housing 309. The rotor magnet elements can be disposed on an outer surface of the CTE portion 308B of the output shaft 308 within the housing 309 to be positioned radially about the rotor 318. The rotor 318 can rotate relative to the stator 312 and the motor 302. The rotor magnet elements can include first rotor magnets 320 having a first polarity and second rotor magnets (e.g., not shown but similar to second rotor magnets 122 shown in FIG. 2B) having a second polarity different from the first polarity. The first rotor magnets 320 and the second rotor magnets can be arranged radially about the rotor 318 such that the polarities of the rotor magnet elements alternate between the first polarity (e.g., radially inward magnetization) and the second polarity (e.g., radially outward magnetization) around the rotor 318. In other words, the magnet elements about the rotor 318 can be arranged to alternate between first rotor magnets 320 and second rotor magnets. As one example, the first rotor magnets 320 can have a first polarity directed radially inward relative to the rotor 318 and towards a center of the CTE 306 and the second polarity of the second rotor magnets (not shown) can be radially outward relative to the rotor 318 and away from the center of the CTE 306. In another alternative, the plurality of stator magnet elements can be disposed to alternate polarities between axial magnetization in a first direction and axial magnetization in an opposite direction. Further, the plurality of rotor magnet elements can be disposed to alternate polarities between axial magnetization in the first direction and axial magnetization in the opposite direction.

With the common output shaft 308 rotated by the motor 302 and being subject to the opposing torque created by the magnetic attractive force between magnets on the rotor 318 and the magnets of the stator 312, the torque created by the CTE 306 is added to the output shaft 308 driven by the motor. Accordingly, the CTE 306 and the motor 302 can be said to be connected "in parallel," such that the torques generated by the motor and the CTE sum at the output (e.g., shaft portion 308C of the output shaft 308) of the MC-PEA 300. Thus, while being in a different position relative to the motor 302, the CTE 306 can still achieve the same effects, characteristics, and properties for MC-PEA 300 that the CTE 106 can achieve for the MC-PEA 100. Namely, the MC-PEA 300 can exhibit the same or similar step sizes, numbers of stable equilibria, cogging torque, resonance and oscillation about a first stable equilibrium, resonance and oscillation between two different stable equilibria, holding torques for holding a load without requiring the motor to be driven, holding a load without consuming energy or producing heat, and any other similar characteristics and properties exhibited by MC-PEA 100 and/or CTE 106.

Figure 4A:
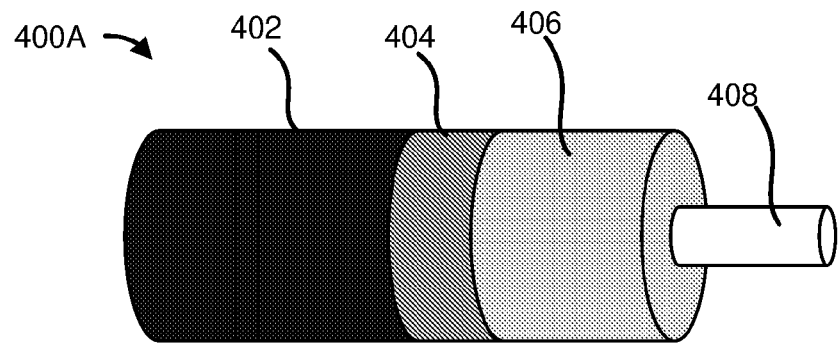
FIG. 4A is a schematic of a magnetic cogging parallel-elastic actuator (MC-PEA) in accordance with an example of the present disclosure, in which the MC-PEA has a parallel co-axial configuration and includes a backdriveable transmission.
Figure 4B:
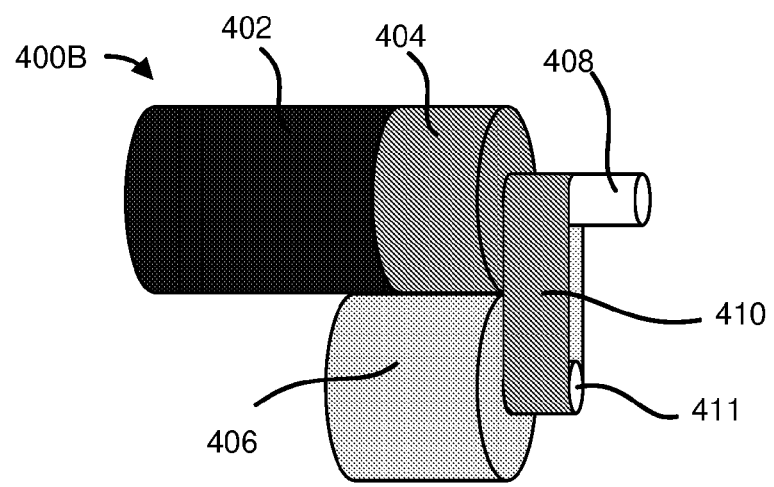
FIG. 4B is a schematic of a magnetic cogging parallel-elastic actuator (MC-PEA) in accordance with an example of the present disclosure, in which the MC-PEA has a parallel axis configuration and includes a backdriveable transmission.

Additional alternative configurations are also possible for producing other MC-PEAs. For example, a transmission can be connected to the motor to provide further functionality to the MC-PEA. FIGS. 4A and 4B illustrate exemplary MC-PEA 400A and MC-PEA 400B, which both include a motor 402, a transmission 404, a CTE 406, and an output shaft 408. The transmission can be connected to the output shaft of the motor 402. In FIG. 4A, a co-axial arrangement is illustrated in which the CTE 406 and the motor 402 share a common output shaft 408. The transmission 404 is also coupled to the output shaft 408.

FIG. 4B illustrates an alternative MC-PEA 400B in which an output shaft 411 of the CTE 406 is connected to the motor 402, the transmission 404, and the output shaft 408 via a drive belt 410. In MC-PEA 400A the arrangement of the CTE 406 and the motor 402 is co-axial, while the arrangement of MC-PEA 400B is offset such that the axis of the output shaft 411 is offset from, but parallel to, the axis of the output shaft 408. However, in both configurations, the torques generated by the motor 402 and the CTE 406 sum at the output (e.g., output shaft 408) of the MC-PEA (i.e., MC-PEA 400A or MC-PEA 400B) such that the CTE 406 is said to be connected in parallel with the motor 402.

To add additional functionality to an MC-PEA, such as the examples described herein, the transmission 404 can be a backdriveable transmission to allow the output shaft 408, as well as any components coupled thereto, to be bi-directionally driveable in at least two directions (e.g., rotating the output shaft clockwise and/or counter clockwise). The additional high-efficiency backdrivable transmission 404 can be included either between the motor 402 and the CTE 406, and/or between the CTE 406 and the load at the output shaft 408. By adding a backdrivable transmission to the MC-PEA (e.g., 400A or 400B) with an output shaft that is co-located with the motor's output shaft 408, a joint sensor (e.g., optical encoder) of the motor 402 can be used to sense and estimate statically and dynamically applied loads at the output shaft 408, without the need for an additional torque sensor that is used with backdrivable motors. Additionally, with a backdriveable transmission, the MC-PEA can hold a pose or position at the output shaft 408, under a load, while consuming little to no power and generating little to no heat. This configuration with the backdriveable transmission connected to the CTE and the motor is advantageous because there is typically an inherent tradeoff between the ability for a robotic actuator to be backdriven and an ability to passively hold a static position, or in other words, apply a holding torque. A holding torque can be achieved in a motor by adding a brake to the actuator. However, a brake typically cannot be backdriven. One alternative to adding a brake to an actuator is to use a series clutch actuator, which is essentially a friction brake with a designable load (i.e., torque) at which the brake slips. However, using a series-clutch actuator adds another auxiliary component to an actuator and comes with undesirable and unpredictable nonlinearities. The MC-PEA (e.g., 100, 300, 400A, 400B) of the current disclosure avoids the problems of the brake and the nonlinearities of the series-clutch actuator, while still providing a backdrivable actuator with the ability to passively hold a static position by applying a holding torque.

The MC-PEAs as described herein (e.g., MC-PEA 100, 300, 400A, 400B, or any MC-PEA in accordance with the principles described herein) can be used in a system to cause movement between two or more structural members and to support a load. For example, as illustrated in schematic form in FIG. 5, a system 500 can include an MC-PEA 502. The MC-PEA can be operable to move a first structural member 504 relative to a second structural member 506. The first structural member 504 can be coupled to the second structural member 506 via a joint 508. The MC-PEA 502 can be coupled to the joint 508 and can be operable to actuate the joint 508, thereby causing the first structural member 504 and the second structural member 506 to move relative to each other about the joint 508.

Figure 5:
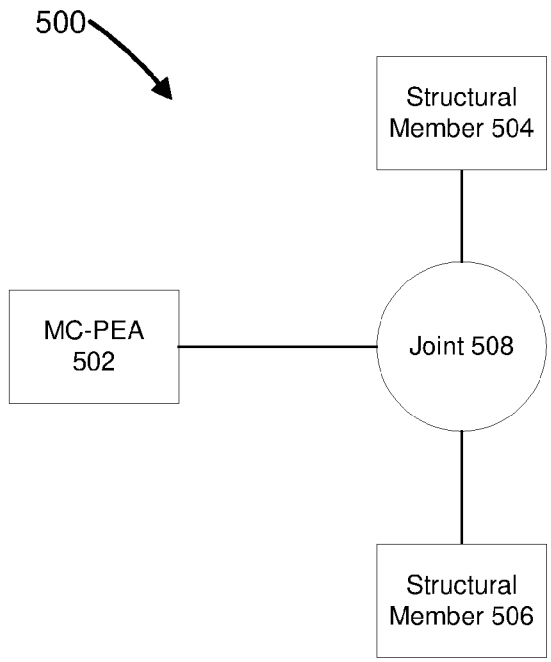
FIG. 5 is a schematic diagram of a magnetic cogging parallel-elastic actuator (MC-PEA) in accordance with an example of the present disclosure connected to a joint that is operable to move two structural members relative to each other.
Figure 6:
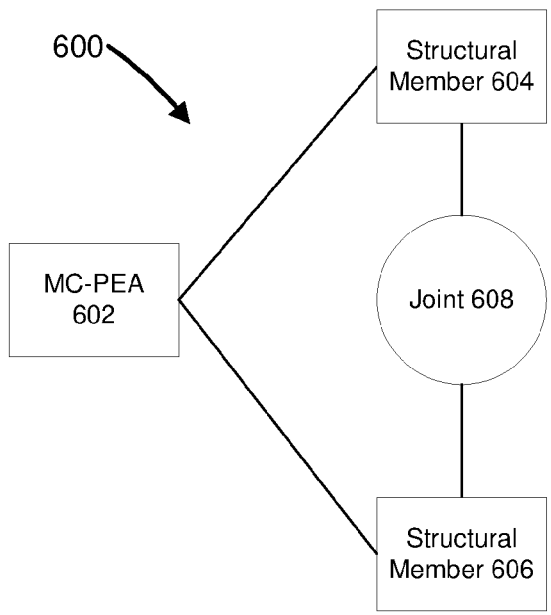
FIG. 6 is a schematic diagram of a magnetic cogging parallel-elastic actuator (MC-PEA) in accordance with an example of the present disclosure connected to a first and second structural member that are connected via a joint.

Alternatively, as illustrated in schematic form in FIG. 6, a system 600 can include an MC-PEA 602 that can be operable to move a first structural member 604 relative to a second structural member 606 by movement of one or more of the structural members (e.g., 604 and 606). In other words, the MC-PEA 602 need not directly drive the joint 608 (as is shown in FIG. 5) but can instead cause movement of the first structural member 504 relative to the second structural member 506 by directly applying a force and imparting movement to one or more of the first structural member 604 and the second structural member 606. It is to be understood that the MC-PEAs 502 and 602 illustrated in FIGS. 5 and 6 can be any MC-PEAs specifically described herein (e.g., 100, 300, 400A, 400B), or can be an alternative MC-PEA made in accordance with the principles described herein. The systems 500 and 600 can be one or more of a robotic system, an exoskeleton, a prosthesis, factory automation equipment, or a medical rehabilitation device.

MC-PEAs designed and used in accordance with the principles described herein exhibit several advantages over the current art. For example, the MC-PEAs designed in accordance with the principles described herein can exhibit a number of resonance modes, making the MC-PEA efficient at generating oscillatory modes such as during gait cycles which make the described MC-PEAs particularly useful and advantageous for use in robot legs, including the legs of autonomous bipedal and quadrupedal robots, as well as prostheses and orthotics. Furthermore, the MC-PEAs described herein include a number of nonlinear magnetic springs created using the alternating polarity magnets disposed on the rotor and the stator. Multiple local minima in magnetic forces occur in various positions of the rotor relative to the stator and, therefore, multiple resonance modes exist. For example the MC-PEA can oscillate around a single stable equilibrium (e.g., defined by one stator magnet 114 or 116 being attracted to a rotor magnet 120 or 122), or, can oscillate between two neighboring stable equilibria (e.g., defined by neighboring stator magnets 114 and 116 being attracted to neighboring stator magnets 120 and 122), which will lead to the existence of efficient periodic motions. For example, flapping-wing flying robots can be constructed using such periodic motion.

The MC-PEA can provide its desirable features in a compact and lightweight package. As described herein, the MC-PEA represents an alternative to series elastic actuators (SEA) used in many applications. In contrast to the SEA, the MC-PEA is substantially simpler to produce and use. For example, as described above, the MC-PEA exhibits a characteristic of having a discrete set of stable equilibria created by strong passive magnetic springs (e.g., rotor and stator magnets 114, 116, 120, and 122). As a result of the stable equilibria, little to no energy is required from the motor to simply hold a static load up to a certain designed value selected by the designer and defined by the holding strength of each of the magnets and the number of magnets used on the rotor and stator. This holding torque is possible to be created and maintained without a separate brake being required. Bursts of energy can be imparted by the motor to cause the MC-PEA to cog over to a neighboring equilibrium. Additionally, with the MC-PEA, there are no unactuated and/or unsensed degrees of freedom, as is common with SEAs. As a result, the MC-PEA may not suffer from the bandwidth limitations that are well known with SEAs.

As an additional benefit, the MC-PEA takes advantage of the thermal properties of DC motors during operation. For example, a motor's data sheet typically includes a max continuous (stall) torque and a max peak torque. The max continuous torque is governed by thermal concerns: if a higher torque is commanded continuously, the motor will eventually burn out. The max continuous torque reported on a data sheet is generally the max RMS torque, due to the relatively slow thermal time constant of a motor. The peak torque provided on the data sheet is often an overly conservative estimate. Accordingly, the max RMS torque can be used to determine what peak torques are acceptable for a certain motor, with allowable torque magnitudes being inversely proportional to the duty cycle of those torques. This insight enables the max passive holding torque of the CTE—summed with the max continuous torque of the motor, which can be neglected to be conservative—to dictate the max continuous torque of the MC-PEA, which enables a smaller motor to be used than would be required in a direct-drive configuration, without sacrificing backdrivability.

Figure 7:
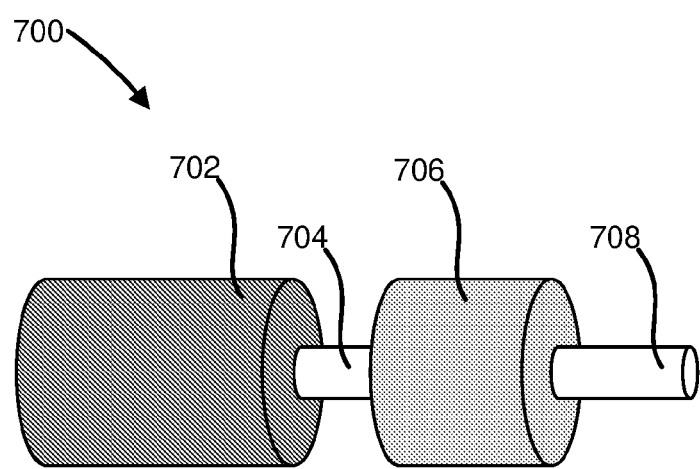
FIG. 7 is a schematic diagram of a series elastic actuator.

To further illustrate the size benefits of the CTE and MC-PEAs described herein, the working principle of the CTE can be compared to a magnetic torque coupler (MTC). Commercial off-the-shelf (COTS) MTCs are available in a variety of sizes (although from limited sources), in both radial and axial designs. As an example, associated peak "synchronous" torques of (COTS) MTCs can range from 0.2-380 N·m for radial designs, and 0.16-61 N·m for axial designs. MTCs are traditionally used in series with a motor, as shown in FIG. 7. FIG. 7 shows an exemplary series elastic actuator 700 including a motor 702 with an output shaft 704, and an MTC 706 coupled to the output shaft 704 of the motor 702. The MTC 706 has an output shaft 708 separate from the output shaft 704 of the motor 702. Generally speaking, radial couplers, (e.g., as illustrated in FIG. 7) are usually of higher cost than axial couplers, but they usually offer a space savings for a given torque. While it may be desirable to use COTS MTCs as shown in FIG. 7 to reduce cost and development time, there are reasons why using COTS MTCs may be suboptimal for use in MC-PEAs. Firstly, for example, in COTS MTCs, for a given peak torque, there is usually only one specific number of magnetic "pole pairs" available. The number of pole pairs available can range from only two pole pairs (i.e., 4 inner-rotor (IR) magnets and 4 outer-rotor (OR) magnets) for smaller scale MTCs. The larger scale MTCs can have 13 pole pairs (26 IR magnets and 26 OR magnets) for the largest MTCs. The reason for this is because MTCs are not intended to involve cogging as part of their function, so there is no notion of "step size" as is of interest in the MC-PEAs described herein.

Figure 8:
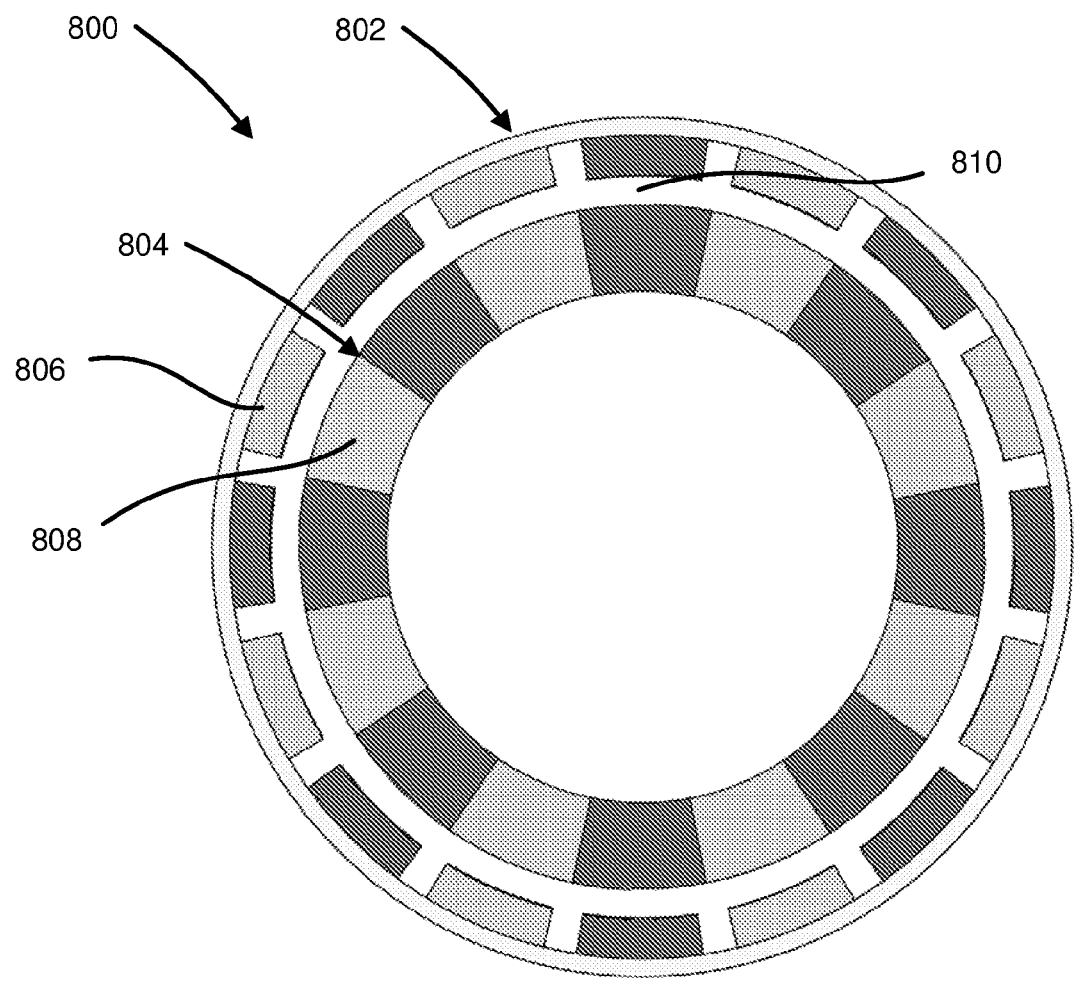
FIG. 8 is an exemplary cross-sectional view illustrating a gap between rotor and stator elements of a magnetic torque coupler.

Secondly, COTS MTCs may not be designed for use in robotics, since MTCs are typically applied to problems in which the input and output shafts must be isolated (e.g., pumps, boat propellers), leading to designs in which the magnet components of a rotor and stator of the MTC are designed to be separated by a gap. An example of an MTC 800 including such a gap is shown in FIG. 8. As shown, MTC 800 can include a stator 802 and a rotor 804. The stator 802 can include stator elements 806 and the rotor 804 can include rotor elements 808. The MTC 800 of FIG. 8 is provided purely for illustration purposes in order to illustrate a gap between rotor elements 808 and stator elements. No disclosure of what the rotor and stator elements comprise, nor the particular number of rotor and stator elements shown in FIG. 8, should be considered as admissions of any known prior art. The FIG. 8 is provided merely to illustrate a possible separation between the rotor 804 and stator 802 as well as the respective elements (e.g., 808 and 806) thereof. The gap 810 between the rotor 804 and stator 802 and their respective elements (e.g., 808 and 806) is shown in FIG. 8. In the MC-PEAs of the present disclosure, such a gap is not necessary, particularly for robotic actuators. In fact, peak torques of a MTC or a CTE, such as taught in the present disclosure, can be sensitive to and vary with a change in the gap 810 size. Such variation in the torques can be minimized by either eliminating the gap, as in the CTE of the present disclosure, or by minimizing the gap to allowable tolerances. Accordingly, the CTE of the present disclosure has benefits over COTS MTC elements. As such, the present disclosure presents a CTE that is modified in comparison to COTS MTCs to achieve new benefits and to realize new custom high-performance CTEs. Further, the CTE can provide motor controlling motion from one stable position to an adjacent stable position.

An additional benefit of MC-PEAs designed in accordance with the principles described herein is the ability of such MC-PEAs to efficiently implement bioinspired motion primitives. Implementing bioinspired motion primitives is typically the domain of soft actuators rather than electromagnetic actuators. There is a growing body of evidence that one enabling factor of human dexterity is the fact that sensorimotor control relies on the composition of primitive dynamic actions. The evidence suggests that humans control motion by a combination of small, relatively fast, pre-learned motion primitives. Each motion primitive can be considered as an open-loop event from the perspective of the brain. The brain then commands control in more of a supervisory fashion, stringing together these motion primitives. Three fundamental motion primitives used by humans may include mechanical impedances, point-to-point submovements, and oscillations. The MC-PEAs described herein include mechanical impedances (e.g., magnetic springs caused by the pole pairs in the CTE), point-to-point submovements (e.g., step sizes between a plurality of stable equilibria), and oscillations (e.g., either about a single stable equilibrium or between two or more stable equilibria). Therefore, by the very nature of the MC-PEA including the CTE, the MC-PEA will lead to adept implementation of the three motion primitives described above. Implementation of this paradigm in robotic actuators will enable improved agility by alleviating some of the direct intervention of the high-level controller.

The MC-PEA, according to the principles described herein, has particular advantages for use in robotic legs, including prostheses, exoskeletons, and the legs of autonomous robots such as humanoids and quadrupeds. Firstly, leveraging the nonlinear dynamics (e.g., varying forces of magnetic interaction between the rotor and stator based on the relative positions between the rotor and the stator) of the MC-PEA itself, including multiple natural resonance modes, will enable efficient gait cycles. Secondly, the inherent passive compliance of the MC-PEA caused by the interaction between the rotor and stator magnets will enable robust operation in highly dynamic and unknown environments. For example, compliance can enable robots using such the MC-PEA to take advantage of beneficial passive dynamics. The compliance of the MC-PEA provides safety so that excessively large forces are not imparted to the human or to the other components of the robot.

Thirdly, the weight of a load being carried by the MC-PEA will cause it to naturally sink down into a stable equilibrium having a holding torque sufficient to support the load while consuming little to no power and producing little to no heat. Furthermore, due to the inherent torque-sensing capabilities of the MC-PEA described herein, with an additional torque sensor, changing static and inertial loads can be estimated and used to update the control system accordingly to accommodate those loads. Also, the thermal management of the MC-PEA (or in other words, the ability of the MC-PEA to support a load while consuming little to no power and producing little to no heat) will allow the MC-PEA to have a very biomimetic behavior in that it will be possible to "walk" indefinitely and "run" for a short duration. After a cool-down period of walking or standing still, the robot can run again.

Being able to hold loads passively while generating little to no heat also makes the MC-PEAs of the present disclosure advantageous for use in autonomous robots that work around people. Using MC-PEAs of the present disclosure in autonomous robots can enable robots that are designed to have a specific maximum strength (e.g., be able to lift a load of up to 30 kg or other designed load) to hold loads of a certain threshold indefinitely without overheating. The MC-PEA can further allow a human to overpower the robot holding the applied load of the certain threshold by applying a force to the load that results in the robot holding a load that is only slightly higher than the threshold load. This will result in a degree of safety for robots operating around humans that is atypical of strong robots.

Figure 9:
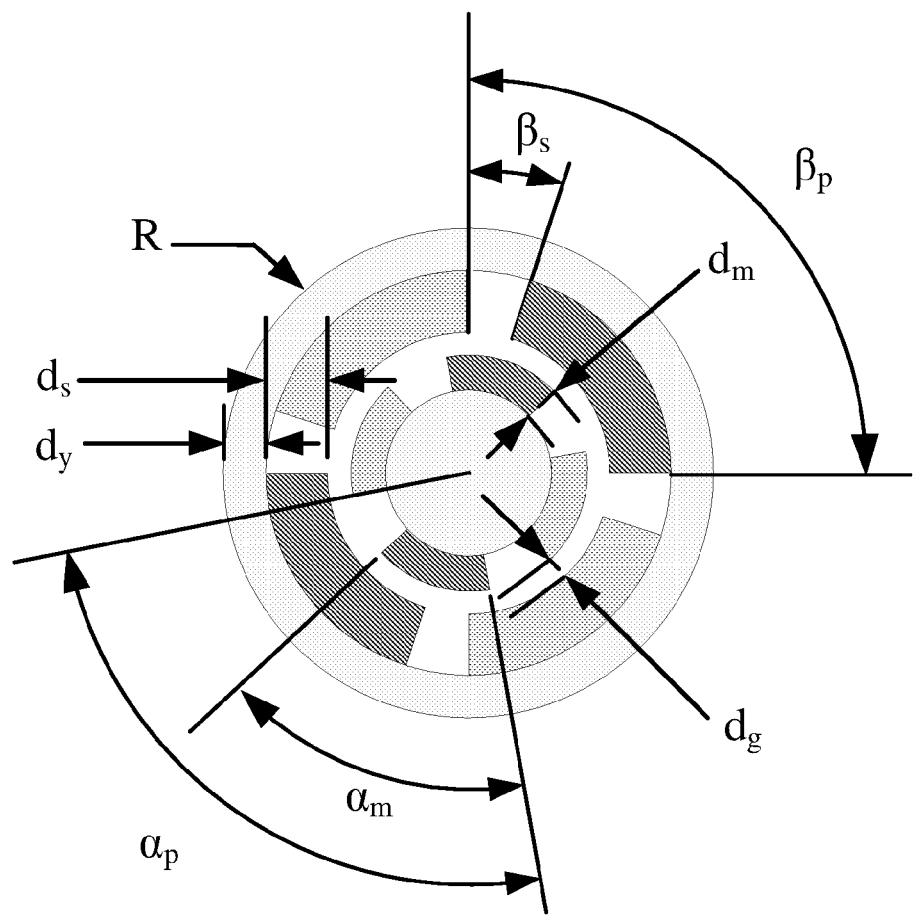
FIG. 9 is a schematic illustrating geometric parameters defining the cross-section of a permanent-magnet torque coupler or cogging torque element.
Figure 10:
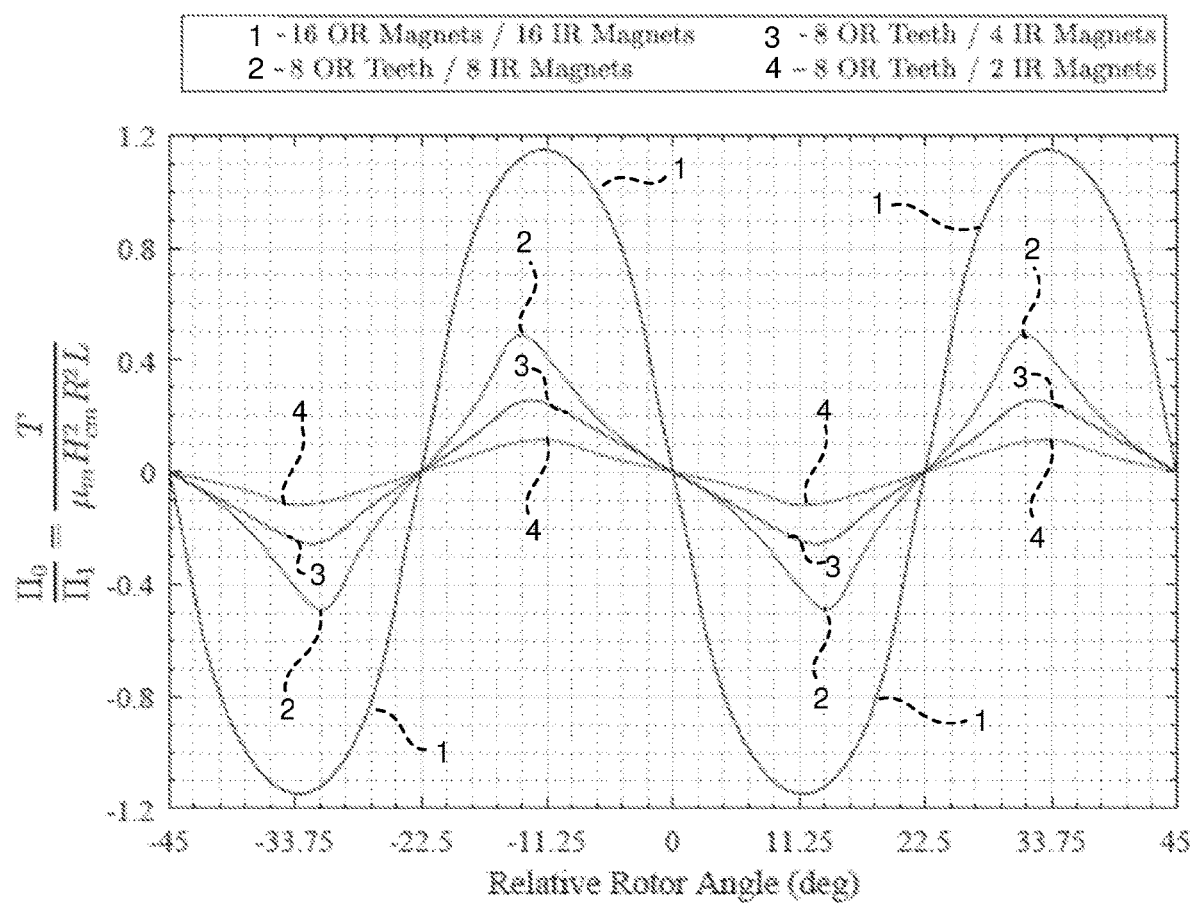
FIG. 10 is a graph of nondimensional cogging-torque vs. relative rotation angle for a several cogging torque elements including: a first cogging torque element with a permanent-magnet outer rotor (OR) (also called a stator), which has 16 inner-rotor (IR) magnets on the rotor and 16 outer-rotor (OR) magnets on the stator; a second cogging torque element having 8 OR soft magnetic teeth and 8 IR permanent magnets; a third cogging torque element having 8 OR soft magnetic teeth and 4 IR magnets; and a fourth cogging torque element having 8 OR soft magnetic teeth and 2 IR magnets. In this example, each of the first through fourth cogging torque element designs have 45° between stable equilibria and the results were obtained from 2D finite element analysis (FEA) simulations, which assume Length/Radius of the CTE goes to infinity (i.e., L/R→∞).
Figure 11:
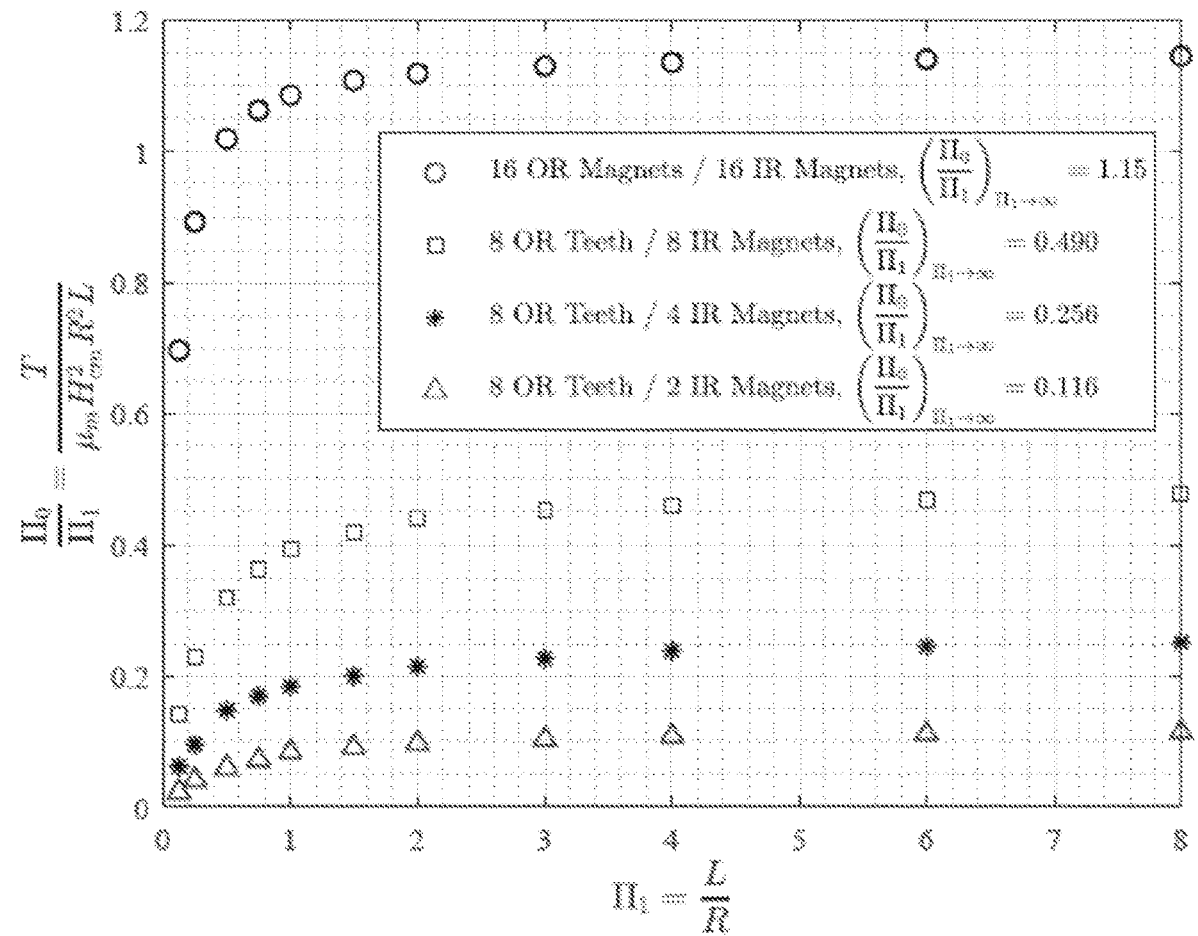
FIG. 11 is a graph of peak nondimensional cogging torque vs. nondimensional length for the first through fourth cogging torque elements (CTE) analyzed in FIG. 10 with the results being obtained from 3D FEA simulations.

As has been discussed above, COTS MTCs may not be suitable for use as CTEs in the MC-PEA of the present disclosure. Consequently, design of alternative CTEs in accordance with the principles of this disclosure can be carried out to produce a CTE that is suitable for use in a robotic joint. An exemplary design analysis of an exemplary CTE is described here with reference to FIGS. 9-11. FIGS. 9-11 illustrate properties of a CTE designed with a 45° step size (i.e., 45° between stable equilibria). While the analysis described below is carried out for a CTE having a 45° step size, it is to be understood that, using the same methodology, CTEs of different step sizes can also be designed.

The exemplary design described in the present disclosure can have 16 inner magnets (e.g., stator magnets), and 16 outer magnets (e.g., rotor magnets) thereby forming 8 "pole pairs" with alternating polarities. In the analysis described with reference to FIGS. 9-11, the MC-PEA is designed to maximize the nondimensional peak cogging torque $\Pi_0$. In some cases, the nondimensional peak cogging torque $\Pi_0$ can be within 50% of maximum, in some cases within, 10% of maximum, in some cases within 5% of maximum, and in other cases within 1% of maximum.

Dimensional analysis is a method that relates a problem's governing parameters to physical laws. By finding a functional relationship between these governing parameters, a complex problem can often be reduced into a simpler one. Dimensional analysis helps minimize the total number of experiments or simulations that must be conducted and enables the results obtained to be better generalized and scaled. One can apply a dimensional analysis technique known as the Buckingham Π theorem to a CTE such as those described herein. To perform the dimensional analysis described herein, first all parameters that define the cogging torque were gathered in Table 1 below. (FIG. 9 and Table 1) The parameters defining the cogging torque include eight geometric parameters (illustrated in FIG. 9), two parameters that characterize the soft-magnetic material used in the stator and rotor magnets, and two parameters that characterize the permanent-magnet material used in the stator and rotor magnets. With a total of 13 governing parameters, and three independent dimensions {m, N, A}, one can expect a total of 13−3=10 different Π groups (i.e., $\Pi_0 = f(\Pi_1, \ldots, \Pi_9)$) (see Table 1). There are two types of CTE. The first comprises a rotor comprising permanent magnets and a stator with permanent magnets. The second type of CTE comprises a rotor comprising permanent magnets and a stator in which the permanent magnets are instead replaced with soft-magnetic teeth. These two CTE concepts can be characterized using the same geometric and material parameters.

TABLE 1

Parameters defining the CTE. IR and OR indicate inner rotor (e.g., the rotor) and the outer rotor (e.g., the stator), respectively.

| Parameter | Sym. | Units | Π Group |
|---|---|---|---|
| Cogging Torque | T | N · m | $\Pi_0 = \dfrac{T}{\mu_m H_{cm}^2 R^3}$ |
| Length | L | m | $\Pi_1 = \dfrac{L}{R}$ |
| Outer Radius | R | m | |
| IR-magnet Thickness | $d_m$ | m | $\Pi_2 = \dfrac{d_m}{R}$ |
| Air-gap Thickness | $d_g$ | m | $\Pi_3 = \dfrac{d_g}{R}$ |
| OR-magnet Thickness | $d_s$ | m | $\Pi_4 = \dfrac{d_s}{R}$ |
| Yoke Thickness | $d_y$ | m | $\Pi_5 = \dfrac{d_y}{R}$ |
| OR-slot Fractional Arc Angle | E | — | $\Pi_6 = E$ |
| IR-magnet Fractional Arc Angle | F | — | $\Pi_7 = F$ |
| Soft-magnetic Permeability | $\mu_y$ | $\dfrac{N}{A^2}$ | $\Pi_8 = \dfrac{\mu_y}{\mu_m}$ |
| Soft-magnetic Saturation | $B_y$ | $\dfrac{N}{A \cdot m}$ | $\Pi_9 = \dfrac{B_y}{\mu_m H_{cm}}$ |
| Permanent-magnet Permeability | $\mu_m$ | $\dfrac{N}{A^3}$ | |
| Permanent-magnet Coercivity | $H_{cm}$ | $\dfrac{A}{m}$ | |

$E = \beta_n/\beta_p$, $F = \alpha_m/\alpha_p$.

A 2D optimization was performed, in which it is assumed that $\Pi_1 \to \infty$ by searching the cross-section-geometry Π terms, ($\Pi_2$-$\Pi_7$) while setting the material Π terms ($\Pi_8$ and $\Pi_9$) constant using realistic values. An inequality constraint was imposed on the rotor-magnet thickness to ensure physically plausible terms: $d_m \le R - d_y - d_s - d_g$.

A brute-force search of all permutations of four values of each Π term (which span plausible values) results in 1024 unique geometries. Subsequently, starting from the design with the highest peak cogging torque, the design can be further optimized. For each design, the cogging-torque waveform can be computed as a function of the relative angle between the rotor and the stator to identify the peak cogging torque of each design. The cogging torque waveforms for exemplary designs of a permanent-magnet stator and three different soft-magnetic outer stators, are shown in FIG. 10. It is evident from FIG. 10 that the permanent magnet stator design outperforms even the best soft-magnetic design by more than a factor of two. A cross-section for the permanent-magnet-outer-rotor CTE is depicted in FIG. 2B of the drawings. The parameters for the design are provided in Table 2.

TABLE 2

Design parameters for permanent-magnet and soft-magnetic stator CTE with 45° between stable equilibria. Results were obtained from 2D FEA (which assumes L/R → ∞) with the following terms held constant: $d_g/R = 0.01$, $\mu_m = 1.046\ \mu_0$, $H_{cm} = 1.027 \times 10^6$ A · m$^{-1}$, $\mu_y = 1.5 \times 10^4\ \mu_0$, and $B_y = 2.35$ N · A$^{-1}$m$^{-1}$.

| Π Group | Permanent-magnet ($N_{OR} = 16$, $N_{IR} = 16$) | Soft-magnetic ($N_{OR} = 8$, $N_{IR} = 8$) |
|---|---|---|
| $\dfrac{\Pi_0}{\Pi_1} = \dfrac{T}{\mu_m H_{cm}^2 R^2 L}$ | 1.15 | 0.490 |
| $\Pi_2 = \dfrac{d_m}{R}$ | 0.296 | 0.787 |
| $\Pi_4 = \dfrac{d_s}{R}$ | 0.109 | 0.0806 |
| $\Pi_5 = \dfrac{d_y}{R}$ | 0.0573 | 0.0180 |
| $\Pi_6 = E$ | 0.185 | 0.366 |
| $\Pi_7 = F$ | 0.978 | 0.980 |

Following the 2D optimization of the CTE, 3D FEA simulations were performed to verify that the 2D-FEA results hold for long length-to-radius aspect ratios and to see how edge effects affect the result for shorter designs. The results are shown in FIG. 11. It is evident from FIG. 11 that the 2D-FEA results are very accurate when the CTE's length is greater than its diameter ($\Pi_1 > 2$), but they greatly over-predict the peak cogging torques for shorter "pancake" designs ($\Pi_1 < 1$). This is due to magnetic flux being lost on the ends of the CTE. Because the optimization was performed in 2D-FEA due to the increased speed of 2D-FEA over 3D-FEA, the designs for low values of $\Pi_1$ (e.g., $\Pi_1 < 1$) may be suboptimal, which could account for some of the diminished performance shown in FIG. 11. Therefore, it would be reasonable to avoid $\Pi_1 < 1$, and apply a peak-cogging-torque correction factor based on FIG. 11.

This will allow the motor to rotate slowly and deliberately across acute angles, typical of the motion required for bio-similar robots. In contrast, standard brushless direct current (DC) motors (without a CTE in parallel as in the MC-PEA of the present disclosure) used in robotics today are designed to rotate smoothly, continuously, and at high speed, which requires them to be geared down, which increases cost, weight, and complexity of motors and the robotic systems which use them. However, the MC-PEA of the present disclosure allows the robotic limb/joint in question to be held still without consuming excessive power or producing excessive heat, thereby decreasing the complexity of robotic joints and robots including such joints, while still providing enhanced performance in a compact and simple package. Applications for the MC-PEA can include, but are not limited to, surgical robotics, bionic prosthetics, military/public safety robotics, companion robots, inspection robots, and factory/warehouse automation. One example of a particularly suitable CTE that can be used with the MC-PEA examples described herein is described in US-2020-0274431-A1 which is incorporated herein by reference.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology. The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. An actuator, comprising:
   a motor comprising a first output shaft; and
   a cogging-torque element comprising:
   a stator that is stationary relative to the motor;
   a rotor that is rotatable relative to the stator and comprises a second output shaft;
   a plurality of stator magnet elements disposed radially about the stator; and
   a plurality of rotor magnet elements radially positioned about the rotor;
   wherein the cogging-torque element is connected in parallel with the motor such that an output torque of the actuator is a sum of a torque of the cogging-torque element and a torque of the motor,
   wherein the first output shaft and the second output shaft rotate in a common direction, and wherein the first output shaft of the motor is parallel but not co-axial with the second output shaft of the cogging-torque element and each of the first and second output shafts are connected such that an output torque of the actuator is a sum of a torque of the cogging-torque element and a torque of the motor.

2. The actuator of claim 1, further comprising a back-driveable transmission connected to the first output shaft of the motor.

3. The actuator of claim 1, wherein the plurality of stator magnet elements comprises an even-integer number of N magnet elements.

4. The actuator of claim 3, wherein the plurality of rotor magnet elements comprises an even-integer number of N magnet elements.

5. The actuator of claim 4, wherein the actuator comprises N/2 stable equilibria when no power is consumed by the motor, the N/2 stable equilibria being created by magnetic interaction between the plurality of stator magnet elements and the plurality of rotor magnet elements of the cogging-torque element.

6. The actuator of claim 5, wherein the motor is driveable to transition the cogging-torque element from a first stable equilibrium to a second stable equilibrium.

7. The actuator of claim 5, wherein the motor torque to transition the cogging-torque element from a first stable equilibrium to a second stable equilibrium is higher than a rated holding torque of the motor.

8. The actuator of claim 5, in which the motor generates an oscillating torque to excite a resonance in the cogging-torque element in which the rotor of the cogging-torque element oscillates around a first equilibrium of the N/2 stable equilibria.

9. The actuator of claim 5, in which the motor generates an oscillating torque to excite a resonance in the cogging-torque element in which the rotor of the cogging-torque element oscillates between a first equilibrium of the N/2 stable equilibria and a second equilibrium of the N/2 stable equilibria.

10. The actuator of claim 1, wherein at least one of the plurality of stator magnet elements or the plurality of rotor magnet elements are at least partially made of a soft-magnetic material.

11. The actuator of claim 1, wherein at least one of the plurality of stator magnet elements or the plurality of rotor magnet elements comprises a plurality of permanent magnets.

12. The actuator of claim 1, wherein the plurality of stator magnet elements and the plurality of rotor magnet elements each comprise a plurality of permanent magnets.

13. The actuator of claim 1, wherein the plurality of stator magnet elements are disposed to alternate polarities radially about the stator between radially outward magnetization and radially inward magnetization with respect to the stator.

14. The actuator of claim 13, wherein the plurality of rotor magnet elements are disposed to alternate polarities radially about the rotor between radially outward magnetization and radially inward magnetization with respect to the rotor.

15. The actuator of claim 1, wherein the plurality of stator magnet elements are disposed to alternate polarities between axial magnetization in a first direction and axial magnetization in an opposite direction.

16. The actuator of claim 15, wherein the plurality of rotor magnet elements are disposed to alternate polarities between axial magnetization in the first direction and axial magnetization in the opposite direction.

17. The actuator of claim 1, wherein the motor is one of a brushless DC motor, a brushed DC motor, a hydraulic motor, or a pneumatic motor.

18. The actuator of claim 1, wherein the actuator is configured to apply a torque to the first output shaft of the motor without the motor being in operation.

19. A system comprising:

a first structural member;

a second structural member coupled to the first structural member at a joint; and an actuator associated with the joint and operable move the first structural member relative to the second structural member about the joint, the actuator comprising:

a motor comprising a first output shaft; and a cogging-torque element comprising:

a stator that is stationary relative to the motor;

a rotor that is rotatable relative to the stator and comprises a second output shaft;

a plurality of stator magnet elements disposed radially about the stator; and a plurality of rotor magnet elements radially positioned about the rotor;

wherein the second output shaft of the rotor of the cogging-torque element is connected in parallel with the first output shaft of the motor such that an output torque of the actuator is a sum of a torque of the cogging-torque element and a torque of the motor, wherein the first output shaft and the second output shaft rotate in the same direction, and wherein the first output shaft of the motor is parallel but not co-axial with the second output shaft of the cogging-torque element and each of the first and second output shafts are connected such that an output torque of the actuator is a sum of a torque of the cogging-torque element and a torque of the motor.

20. The system of claim 19, wherein the system is at least one of a robotic system, an exoskeleton, a prosthesis, or a medical rehabilitation device.

* * * * *